United States Patent
Choi et al.

(10) Patent No.: US 10,162,102 B2
(45) Date of Patent: Dec. 25, 2018

(54) BACKLIGHT UNIT AND DISPLAY DEVICE INCLUDING THE SAME

(71) Applicant: LG Display Co., Ltd., Seoul (KR)

(72) Inventors: Hyun Choi, Gyeonggi-do (KR); HyunChul Kim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 7 days.

(21) Appl. No.: 15/361,764

(22) Filed: Nov. 28, 2016

(65) Prior Publication Data

US 2017/0160464 A1 Jun. 8, 2017

(30) Foreign Application Priority Data

Dec. 7, 2015 (KR) .................. 10-2015-0173240

(51) Int. Cl.
*G02F 1/1333* (2006.01)
*F21V 8/00* (2006.01)

(52) U.S. Cl.
CPC .................. *G02B 6/0088* (2013.01)

(58) Field of Classification Search
CPC .................................................. G02B 6/0088
See application file for complete search history.

(56) References Cited

U.S. PATENT DOCUMENTS

| 2009/0109368 A1* | 4/2009 | Watanabe | G02B 6/0083 349/58 |
| 2012/0206940 A1* | 8/2012 | Han | G02B 6/0068 362/609 |
| 2014/0043848 A1* | 2/2014 | Jung | G02B 6/0055 362/606 |

\* cited by examiner

*Primary Examiner* — Charles Chang
(74) *Attorney, Agent, or Firm* — Morgan, Lewis & Bockius LLP (57) ABSTRACT

Disclosed are a backlight unit and a display device including the same. The backlight unit includes a light guide plate, a light source unit irradiating light onto a light incident surface provided on a side surface of the light guide plate, an accommodating case including a case side wall which supports the light guide plate and surrounds a side surface of the light guide plate, and a light guide plate fixing member installed on the case side wall to prevent a movement of the light guide plate.

18 Claims, 7 Drawing Sheets

BACKLIGHT UNIT AND DISPLAY DEVICE INCLUDING THE SAME

CROSS-REFERENCE TO RELATED APPLICATIONS

This application claims the benefit of the Korean Patent Application No. 10-2015-0173240 filed on Dec. 7, 2015, which is hereby incorporated by reference as if fully set forth herein.

BACKGROUND

Field of the Invention

The present invention relates to a backlight unit and a display device including the same.

Discussion of the Related Art

Display devices display an image by using thin film transistors (TFTs) as switching elements. The display devices are widely used as display devices for notebook computers, tablet computers, smartphones, portable display devices, and portable information devices, in addition to televisions or monitors. Since the display devices cannot self-emit light, the display devices display an image by using light emitted from a backlight unit which is disposed under a display panel.

The backlight unit is categorized into a direct type and an edge type depending on an arrangement structure of light sources. An edge type backlight unit has a structure where the light sources are arranged on one side of a light guide plate, and the direct type backlight unit has a structure where the light sources are arranged under a display panel. Here, since the direct type backlight unit has a limitation in thinning a thickness, the direct type backlight unit is mainly applied to display devices where brightness is more important than a thickness of a display panel. The edge type backlight unit is more easily lightened and thinned than the direct type backlight unit, and thus, is mainly applied to display devices, where a thickness is importantly treated, such as notebook personal computers (PCs), PCs for monitors, etc.

In the edge type backlight unit, various methods are being used for stably fixing a light guide plate to a display device.

Figure 1:
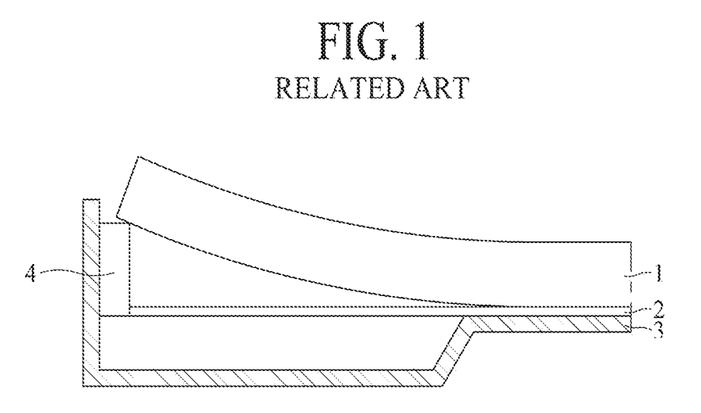
FIG. 1 is a cross-sectional view schematically illustrating a related art display device.

FIG. 1 is a cross-sectional view schematically illustrating a related art display device.

Referring to FIG. 1, the related art display device includes a light guide plate 1, a reflective sheet 2, an accommodating case 3, and a light guide plate fixing member 4.

The light guide plate 1 guides light emitted from a light source (not shown) to output the light to an upper portion, thereby irradiating the light onto a rear surface of a display panel (not shown).

The reflective sheet 2 is disposed on a rear surface of the light guide plate 1 to reflect light, irradiated onto a lower side of the light guide plate 1, to the inside of the light guide plate 1, thereby enhancing light efficiency.

One side of the accommodating case 3 supports the reflective sheet 2, and the other side supports the light guide plate fixing member 4.

The light guide plate fixing member 4 is attached on the one side of the accommodating case 3 to face the light guide plate 1.

In the related art display device, as illustrated in FIG. 1, due to an assembly defect of the light guide plate 1 and the accommodating case 3, the light guide plate 1 is not stably disposed in the accommodating case 3 and can be hung on the light guide plate fixing member 4. In the related art display device, the light guide plate 1 is assembled after the light guide plate fixing member 4 is attached on the accommodating case 3, and thus, if a sufficient space for assembling the light guide plate 1 is not provided, a defect where the light guide plate 1 is not normally assembled with the accommodating case 3 can occur. For this reason, in the related art display device, an assembly defect occurs, causing a reduction in quality and reliability of the display device.

SUMMARY

Accordingly, the present invention is directed to provide a backlight unit and a display device including the same that substantially obviate one or more problems due to limitations and disadvantages of the related art.

An object of the present invention is to provide a display device with enhanced quality and reliability.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, there is provided a backlight unit including a light guide plate, a light source unit irradiating light onto a light incident surface provided on a side surface of the light guide plate, an accommodating case including a case side wall which supports the light guide plate and surrounds a side surface of the light guide plate, and a light guide plate fixing member installed on the case side wall to prevent a movement of the light guide plate and a display device including the same.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION

Reference will now be made in detail to the exemplary embodiments of the present invention, examples of which are illustrated in the accompanying drawings. Wherever possible, the same reference numbers will be used throughout the drawings to refer to the same or like parts.

The terms described in the specification should be understood as follows.

The terms described in the specification should be understood as follows. As used herein, the singular forms "a", "an" and "the" are intended to include the plural forms as well, unless the context clearly indicates otherwise. The terms "first" and "second" are for differentiating one element from the other element, and these elements should not be limited by these terms. It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

Hereinafter, a display device according to embodiments of the present invention will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present invention, the detailed description will be omitted.

Figure 2:
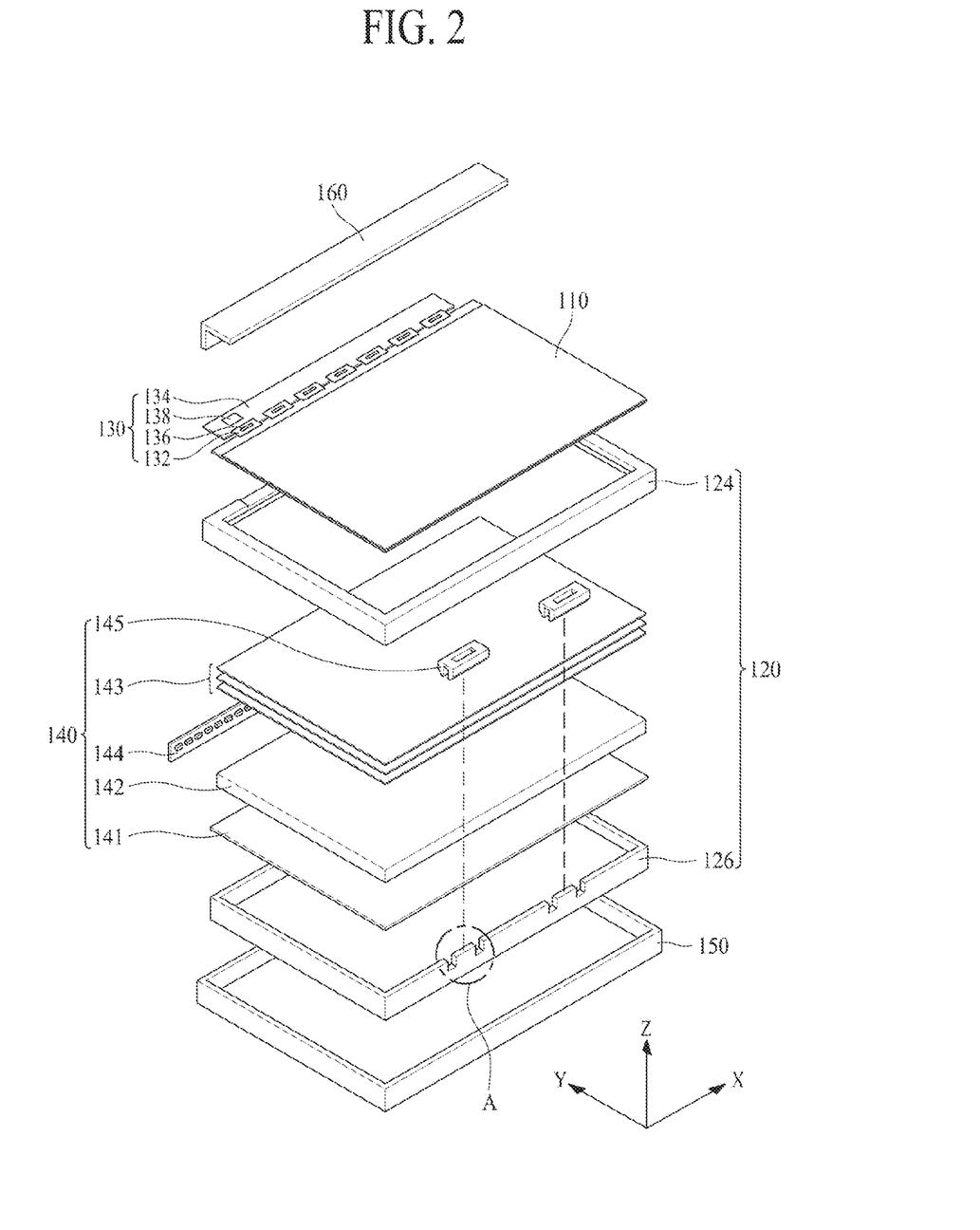
FIG. 2 is an exploded perspective view of a display device according to an embodiment of the present invention.

FIG. 2 is an exploded perspective view of a display device according to an embodiment of the present invention.

Referring to FIG. 2, the display device according to an embodiment of the present invention may include a display panel 110, a panel supporting part 120, a panel driver 130, a backlight unit 140, an appearance case 150, and a front portion cover 160.

The display panel 110 may adjust a light transmittance of a liquid crystal layer to display an image and may include a lower substrate and an upper substrate which are oppositely bonded to each other with the liquid crystal layer therebetween, a lower polarization member, and an upper polarization member. The display panel 110 may drive the liquid crystal layer with an electric field which is generated in each of a plurality of pixels by a data voltage and a common voltage applied to each pixel, thereby displaying a color image according to the light transmittance of the liquid crystal layer.

The panel supporting part 120 may include a guide frame 124 and an accommodating case 126.

The guide frame 124 may be disposed under the display panel 110 to support the display panel 110.

The accommodating case 126 may support the light guide plate 142 and the guide frame 124. A plurality of coupling grooves 126b1 and 126b2 into which a light guide plate fixing member 145 to be described below is fitted may be provided in the accommodating case 126.

The panel driver 130 may be connected to a pad part provided on the lower substrate to drive each of the pixels of the display panel 110, thereby displaying a color image on the display panel 110. The panel driver 130 according to an embodiment may include a plurality of circuit films 132 connected to the pad part of the display panel 110, a data driving integrated circuit (IC) 136 mounted on each of the plurality of circuit films 132, a printed circuit board (PCB) 134 coupled to each of the plurality of circuit films 132, and a timing controller 138 mounted on the PCB 134.

Each of the circuit films 132 may be attached between the pad part of the lower substrate and a gate PCB through a film attach process and may be a tape carrier package (TCP) or a chip-on film (COF, chip-on flexible board). Each of the plurality of circuit films 132 may be bent along one surface (i.e., a lower surface) of the display panel 110 and may be disposed on a rear surface of the guide frame 124.

The data driving IC 136 may be mounted on each of the plurality of circuit films 132 and may be connected to the pad part through a corresponding circuit film 132. The data driver IC 136 may receive pixel data for each pixel and a data control signal which are supplied from the timing controller 138, and may convert the pixel data for each pixel according to the data control signal into an analog data signal to supply the analog data signal to a corresponding data line through the pad part.

The PCB 134 may be connected to the plurality of circuit films 132. The PCB 134 may supply signals, which are necessary for displaying an image on each pixel of the display panel 110, to the data driving IC 136 and a gate driving circuit. To this end, various signal lines, various power circuits (not shown), and a memory device (not shown) may be mounted on the PCB 134.

The timing controller 138 may be mounted on the PCB 134. In response to a timing synchronization signal supplied from an external driving system (not shown), the timing controller 138 may align digital video data input from the external driving system according to a pixel arrangement structure of the display panel 110 to generate pixel data for each pixel and may supply the generated pixel data for each pixel to the data driving IC 136. Also, the timing controller 138 may generate a data control signal and a gate control signal based on the timing synchronization signal to control a driving timing of each of the data driving IC 136 and the gate driving circuit.

In addition, the timing controller 138 may control the backlight unit 140 by using edge-type local dimming technology, thereby individually controlling luminance of each area of the display panel 110.

The backlight unit 140 may be disposed under the display panel 110 to irradiate light onto a lower surface of the display panel 110. Therefore, the backlight unit 140 may be disposed under the display panel 110. In this case, the backlight unit 140 may be accommodated into the accommodating case 126. The backlight unit 140 according to an embodiment may include a reflective sheet 141, a light guide plate 142, an optical sheet part 143, a light source unit 144, and the light guide plate fixing member 145.

The reflective sheet 141 may be disposed on a bottom of the light guide plate 142 to reflect the light, which incident from the light guide plate 142, to the light guide plate 142, thereby minimizing the loss of the light traveling to a rear surface of the light guide plate 142.

The light guide plate 142 may include a light incident surface provided on one surface thereof, and to this end, may be provided in a plate (or wedge) shape. Therefore, the light guide plate 142 may transfer the light, which is incident through the light incident surface from the light source unit 144, to the display panel 110.

The optical sheet part 143 may be disposed on the light guide plate 142 and may include a lower diffusive sheet, a prism sheet, and an upper diffusive sheet, but is not limited thereto. In other embodiments, the optical sheet part 143 may be configured by a stacked combination of two or more sheets selected from among a diffusive sheet, a prism sheet, a dual brightness enhancement film, and a lenticular sheet.

The light source unit 144 may be disposed to face one surface of the light guide plate 142 and may irradiate the light onto the light incident surface provided on the one surface of the light guide plate 142. The light source unit 144 according to an embodiment may include a plurality of light emitting diode (LED) packages which are mounted on an array substrate and emit white light according to a light source unit driving signal supplied from a backlight driver (not shown).

The light guide plate fixing member 145 may be fitted into the accommodating case 126 to face the one surface of the light guide plate 142 other than the light incident surface and may have elasticity. The light guide plate fixing member 145 may support and fix one side of the light guide plate 142, and thus, the light guide plate 142 is prevented from being cracked due to friction with other elements even when the display device is shaken. Also, the light guide plate fixing member 145 may fix the light guide plate 142, and thus, a certain interval between the light guide plate 142 and the light source unit 144 is maintained, thereby enabling the display device to maintain certain brightness.

The appearance case 150 may accommodate the accommodating case 126 and may surround a side surface of the guide frame 124, thereby forming an external appearance.

The front portion cover 160 may be coupled to the guide frame 124 to cover one edge of the display panel 110. The front portion cover 160 may cover the panel driver 130 connected to the one edge of the display panel 110.

In the display device according to an embodiment of the present invention, the light guide plate 142 may be accommodated into the accommodating case 126, and then, the light guide plate fixing member 145 may be fitted into and coupled to the accommodating case 126, thereby preventing an assembly defect which occurs when a sufficient space for assembling the light guide plate 142 with the accommodating case 126 is not provided due to the light guide plate fixing member 145. Therefore, the quality and reliability of the display device according to an embodiment of the present invention are prevented from being reduced. Also, in the display device according to an embodiment of the present invention, since the light guide plate fixing member 145 is coupled to the accommodating case 126 to support the light guide plate 142, the light guide plate 142 is prevented from being cracked due to friction with other elements. Also, when the display device according to an embodiment of the present invention is inclined, the light guide plate 142 is prevented from downward sagging due to a load, and thus, a certain interval between the light guide plate 142 and the light source unit 144 is maintained. Accordingly, the display device maintains certain brightness, thereby preventing the image quality of the display device from being degraded.

Figure 3:
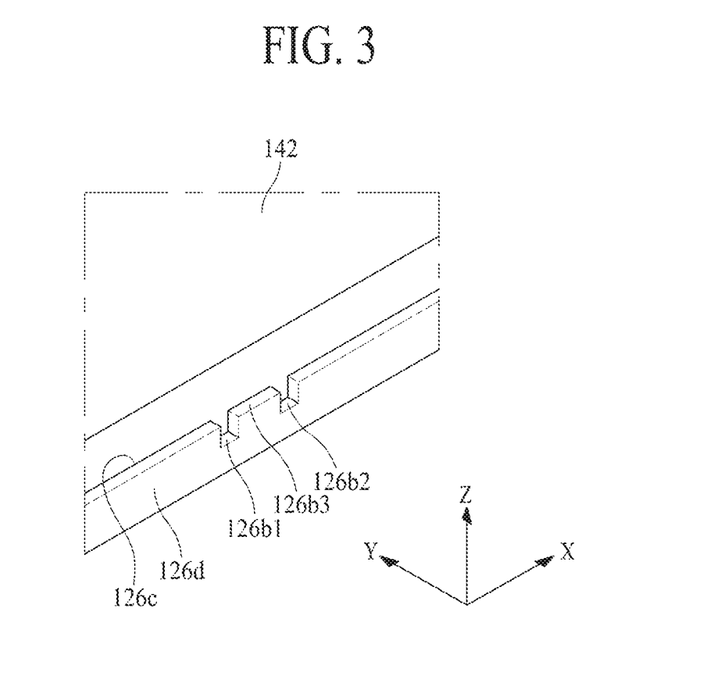
FIG. 3 is a perspective view of an accommodating case according to an embodiment of the present invention and is an enlarged view of an A portion of FIG. 2.

FIG. 3 is a perspective view of the accommodating case 126 according to an embodiment of the present invention and is an enlarged view of an A portion of FIG. 2.

Referring to FIG. 3, the accommodating case 126 according to an embodiment of the present invention may include an inner surface 126c facing the light guide plate 142, an outer surface 126d opposite to the inner surface 126c, and a plurality of coupling grooves 126b1 and 126b2 and a coupling projection 126b3 which are provided one side of the accommodating case 126 and are coupled to the light guide plate fixing member 145.

The coupling grooves 126b1 and 126b2 may include a first coupling groove 126b1 and a second coupling groove 126b2. The first and second coupling grooves 126b1 and 126b2 may be spaced apart from each other by a certain interval. The first and second coupling grooves 126b1 and 126b2 may be coupled to the light guide plate fixing member 145 and fixed to the accommodating case 126.

The coupling projection 126b3 may be provided between the first coupling groove 126b1 and the second coupling groove 126b2. The coupling projection 126b3 may be a protrusion which is provided by the first and second coupling grooves 126b1 and 126b2 provided on both sides of the coupling projection 126b3, and may have a height which is the same as that of the other side of the accommodating case 126 where the first coupling groove 126b1 and the second coupling groove 126b2 are not provided. The coupling projection 126b3 may be coupled to a hole provided in the light guide plate fixing member 145 and may be fixed to the accommodating case 126.

In the drawing, it is illustrated that the coupling grooves 126b1 and 126b2 and the coupling projection 126b3 are provided on only one side of the accommodating case 126 overlapping a light non-incident surface of the light guide plate 142, but the present embodiment is not limited thereto. In other embodiments, the coupling grooves 126b1 and 126b2 and the coupling projection 126b3 may be provided in plurality on the other side of the accommodating case 126 overlapping the other side of the light guide plate 142 other than the light incident surface.

The accommodating case 126 according to an embodiment of the present invention may fix the below-described light guide plate fixing member 145 not to move or deviate in an X-axis direction and a Y-axis direction, and thus, the light guide plate fixing member 145 stably supports the light guide plate 142. Therefore, in the display device according to an embodiment of the present invention, the light guide plate 142 is prevented from being cracked due to friction with other elements. Also, when the display device according to an embodiment of the present invention is inclined to one side, the light guide plate 142 is prevented from downward sagging due to a load, and thus, a certain interval between the light guide plate 142 and the light source unit 144 is maintained. Accordingly, the display device maintains certain brightness, thereby preventing the image quality of the display device from being degraded. Also, the light guide plate 142 may be accommodated into the accommodating case 126 according to an embodiment of the present invention, and then, the light guide plate fixing member 145 may be fitted into and coupled to the accommodating case 126, thereby preventing an assembly defect which occurs when a sufficient space for assembling the light guide plate 142 with the accommodating case 126 is not provided due to the light guide plate fixing member 145. Therefore, the accommodating case 126 according to an embodiment of the present invention prevents the quality and reliability of the display device from being reduced.

Figure 4:
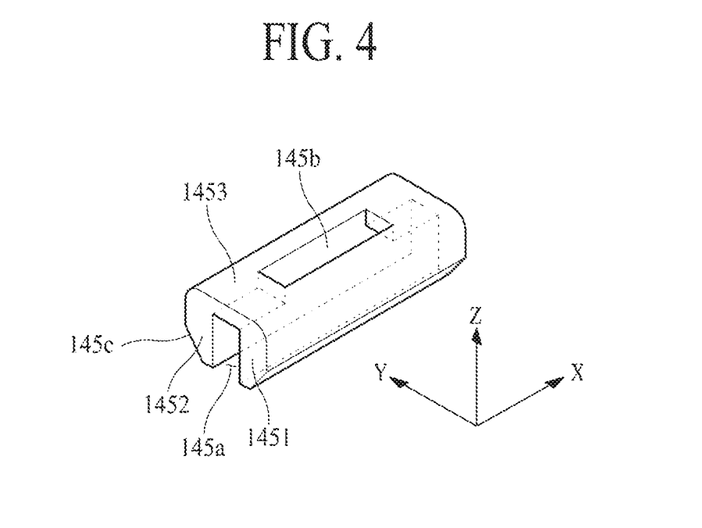
FIG. 4 is a perspective view of a light guide plate fixing member according to an embodiment of the present invention.

FIG. 4 is a perspective view of the light guide plate fixing member 145 according to an embodiment of the present invention.

Referring to FIG. 4, the light guide plate fixing member 145 may include a first fixing part 1451, a second fixing part 1452, and a connection part 1453.

The first fixing part 1451 may be disposed between the inner surface 126c of a case side wall 126b and the light guide plate 142 to support and fix the light guide plate 142.

The second fixing part 1452 may be disposed on an outer surface 126d of the case side wall 126b in parallel with the first fixing part 1451. The second fixing part 1452 may be disposed symmetrical about the first fixing part 1451 so that the same effect is obtained even though the second fixing part 1452 is fitted to the case side wall 126b in any direction.

The connection part 1453 may be disposed on the case side wall 126b to connect the first fixing part 1451 to the second fixing part 1452. The connection part 1453 may fix the first and second fixing parts 1451 and 1452 to the case side wall 126b. In this case, a top of the connection part 1453 may face one surface of the guide frame 124 surrounding the accommodating case 126. Therefore, the light guide plate fixing member 145 does not move or deviate even when the display device is shaken in a vertical direction (a Z-axis direction). Also, the connection part 1453 may include a center hole through which a portion of the case side wall 126b passes. Accordingly, the connection part 1453 prevents the light guide plate fixing member 145 from moving or deviating in the Y-axis direction.

Moreover, the light guide plate fixing member 145 may include a side groove 145a provided between the first and second fixing parts 1451 and 1452, a center hole 145b provided in a center of the connection part 1453, and a chamfer part 145c provided in a corner of each of the first and second fixing parts 1451 and 1452.

The side groove 145a may be a groove which passes through a portion under a side surface of the light guide plate fixing member 145 in a lengthwise direction, and the case side wall 126b of the accommodating case 126 may be inserted into the side groove 145a to fix the light guide plate fixing member 145. In more detail, the side groove 145a may be coupled to the coupling grooves 126b1 and 126b2 provided in the accommodating case 126 to fix the light guide plate fixing member 145. The side groove 145a prevents the light guide plate fixing member 145 from moving or deviating in the Y-axis direction.

The center hole 145b may be a hole passing through a top of the light guide plate fixing member 145, and a portion of the case side wall 126b of the accommodating case 126 may pass through the center hole 145b. In more detail, the center hole 145b may be coupled to the coupling projection 126b3 of the accommodating case 126 to fix the light guide plate fixing member 145. The center hole 145b prevents the light guide plate fixing member 145 from moving or deviating in the X-axis direction.

The chamfer part 145c may be an inclined portion provided in a side corner of the light guide plate fixing member 145, and in more detail, may be provided in a corner opposite to the connection part 1453. In this case, the chamfer part 145c may be provided in only a lower corner of the first fixing part 1451, but is not limited thereto. In other embodiments, the chamfer part 145c may be provided symmetrical about the first and second fixing parts 1451 and 1452 so that even when a worker fits the light guide plate fixing member 145 into the case side wall 126b in one direction, the same shape is provided. The chamfer part 145c may be provided so that in a case where the light guide plate fixing member 145 having elasticity is fitted between the light guide plate 142 and the accommodating case 126, the light guide plate fixing member 145 slides and thus is easily fitted into a narrow space.

In the light guide plate fixing member 145 according to an embodiment of the present invention, the side groove 145a and the center hole 145b may be coupled to the coupling grooves 126b1 and 126b2 of the accommodating case 126 and the coupling projection 126b3, and thus, even when the display device is shaken, the light guide plate fixing member 145 does not move or deviate to a side. Therefore, the light guide plate fixing member 145 stably supports the light guide plate 142, and thus, the light guide plate 142 is prevented from being cracked due to friction with other elements. Also, when the display device is inclined, the light guide plate fixing member 145 prevents the light guide plate 142 from downward sagging due to a load, and thus, a certain interval between the light guide plate 142 and the light source unit 144 is maintained. Accordingly, the display device maintains certain brightness, thereby preventing the image quality of the display device from being degraded. Also, the light guide plate 142 may be accommodated into the accommodating case 126, and then, the light guide plate fixing member 145 according to an embodiment of the present invention may be coupled to the accommodating case 126, thereby preventing an assembly defect which occurs when a sufficient space for assembling the light guide plate 142 with the accommodating case 126 is not provided due to the light guide plate fixing member 145. Therefore, the light guide plate fixing member 145 according to an embodiment of the present invention prevents the quality and reliability of the display device from being reduced.

Figure 5:
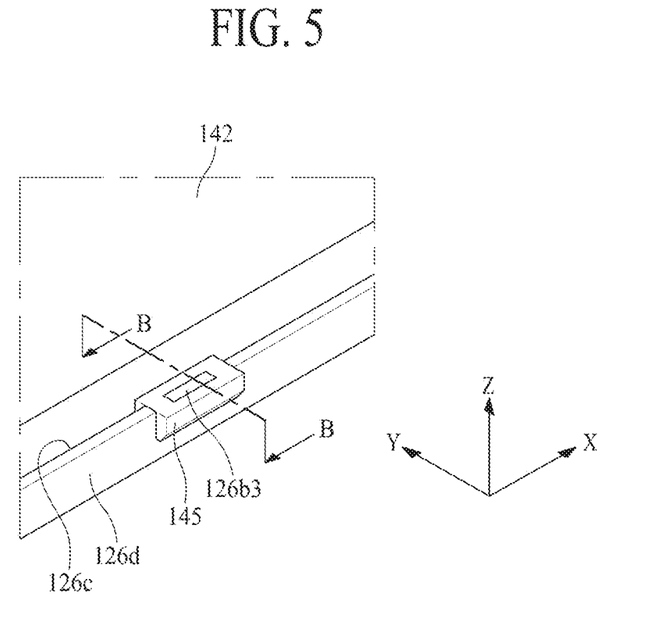
FIG. 5 is a perspective view illustrating an example where an accommodating case and a light guide plate fixing member according to an embodiment of the present invention are coupled to each other.
Figure 6:
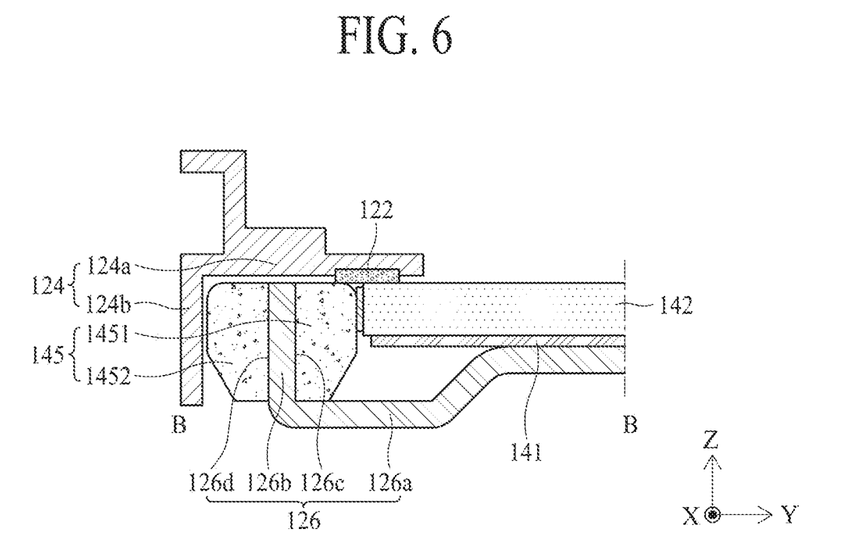
FIG. 6 is a cross-sectional view taken along line B-B of FIG. 5.

FIG. 5 is a perspective view illustrating an example where an accommodating case and a light guide plate fixing member according to an embodiment of the present invention are coupled to each other, and FIG. 6 is a cross-sectional view taken along line B-B of FIG. 5.

Referring to FIGS. 5 and 6, a display device according to an embodiment of the present invention may include an accommodating case 126, a guide frame 124, and a light guide plate fixing member 145.

The accommodating case 126 may accommodate a backlight unit 140. The accommodating case 126 may include a floor 126a and a case side wall 126b.

The floor 126a may support the backlight unit 140, and only an end of the floor 126a may be bent, thereby supporting the backlight unit 140.

The case side wall 126b may be vertically bent from one end of the floor 126a to surround a side surface of a light guide plate 142. The light guide plate fixing member 145 may be installed on the case side wall 126b, and thus, a movement of the light guide plate 142 is prevented. In this case, a plurality of coupling grooves 126b1 and 126b2 and a coupling projection 126b3 may be provided on one side of the case side wall 126b.

The guide frame 124 may support a rear edge of the display panel 110 and may surround the case side wall 126b of the accommodating case 126. The guide frame 124 may be coupled to the light guide plate 142 through the coupling member 122. Here, the coupling member 122 may be a double-sided tape, a thermocurable resin, a photocurable resin, a foam tape, or the like, and for example, may be the double-sided tape or the foam tape having certain elasticity for absorbing an impact. In addition, the coupling member 122 may include a hollow portion, and in this case, the hollow portion relaxes pressure applied to the light guide plate 142 and prevents the partial detachment of the coupling member 122 and the light guide plate 142 when the light guide plate 142 moves.

The guide frame 124 may include a panel supporting part 124a and a guide side wall 124b.

The panel supporting part 124a may be coupled to a rear edge of a display panel 110. The panel supporting part 124a may be disposed to cover a connection part 145c of the light guide plate fixing member 145. Accordingly, the panel supporting part 124a prevents the light guide plate fixing member 145 from moving or deviating even when the display device is shaken a vertical direction (a Z-axis direction).

The guide side wall 124b may be vertically bent from the panel supporting part 124a. The guide side wall 124b may be disposed to cover a second fixing part 1452 of the light guide plate fixing member 145.

A side groove 145a passing through a side surface may be provided in the light guide plate fixing member 145, and thus, the light guide plate fixing member 145 may be coupled to the coupling grooves 126b1 and 126b2 provided on the case side wall 126b. Therefore, one side of the light guide plate fixing member 145 may be disposed outside the accommodating case 126, and the other side may be disposed inside the accommodating case 126 to face the light guide plate 142. In this case, a chamfer part 145c may be provided in a corner under each of the one side and the other side of the light guide plate fixing member 145 so that in a case where the light guide plate fixing member 145 is fitted between the light guide plate 142 and the case side wall 126b, the light guide plate fixing member 145 slides and thus is easily fitted into a narrow space. Also, a center hole 145b passing through a top may be provided in the light guide plate fixing member 145, and thus, the light guide plate fixing member 145 may be coupled to a coupling projection 126b3 provided on the case side wall 126b. In this case, a connection part 1453 surrounding the center hole 145b may be provided in the light guide plate fixing member 145. The connection part 1453 may face one surface of the guide frame 124 surrounding the case side wall 126b of the accommodating case 126.

In the display device according to an embodiment of the present invention, the light guide plate 142 may be accommodated into the accommodating case 126, and then, the light guide plate fixing member 145 may be fitted into and coupled to the accommodating case 126, thereby preventing an assembly defect which occurs when a sufficient space for assembling the light guide plate 142 with the accommodating case 126 is not provided due to the light guide plate fixing member 145. Therefore, the quality and reliability of the display device according to an embodiment of the present invention are prevented from being reduced, and the light guide plate fixing member 145 may be coupled to the accommodating case 126 to support the light guide plate 142, thereby preventing the image quality of the display device from being degraded.

Figure 7:
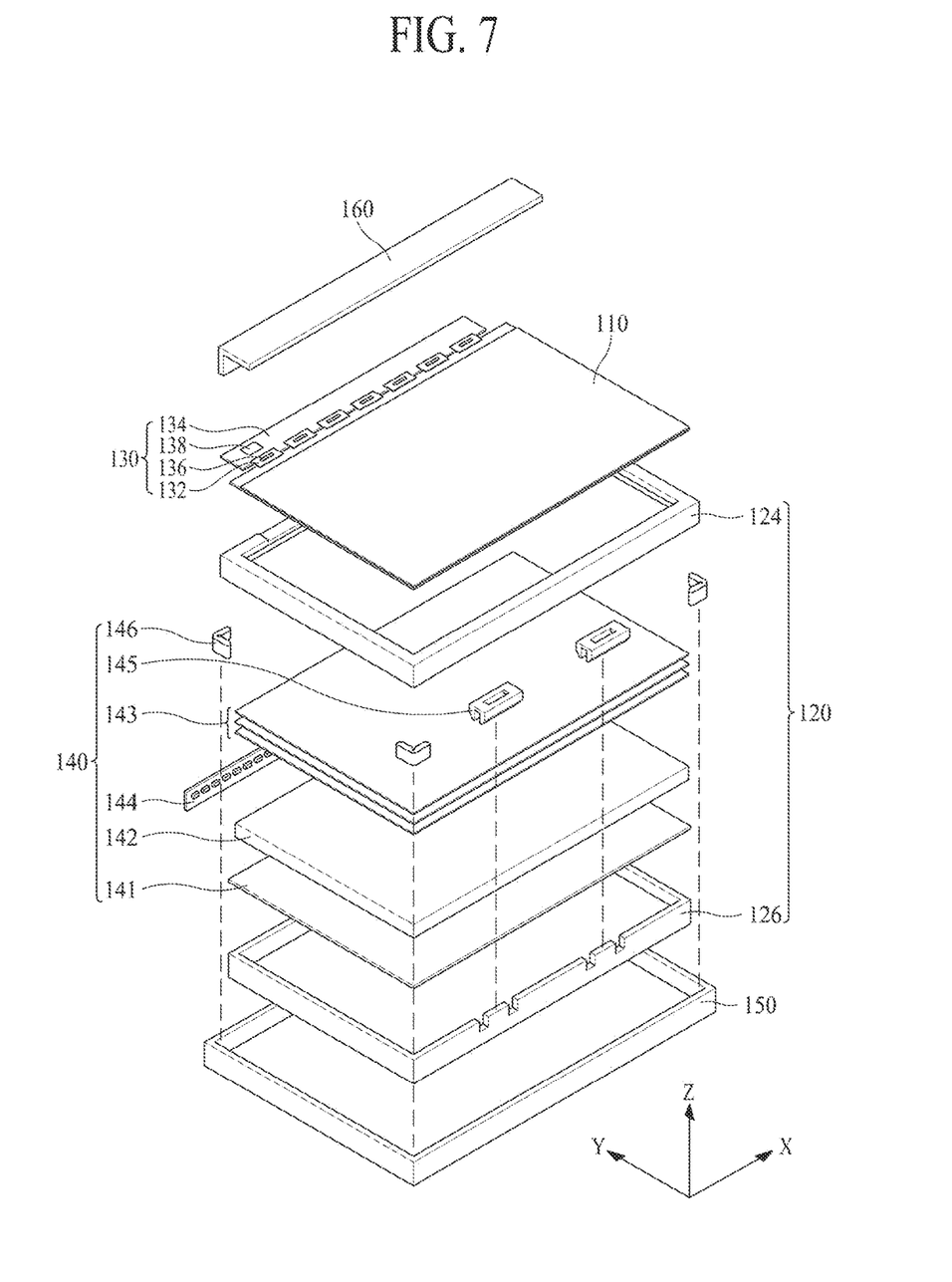
FIG. 7 is an exploded perspective view of a display device according to another embodiment of the present invention.
Figure 8:
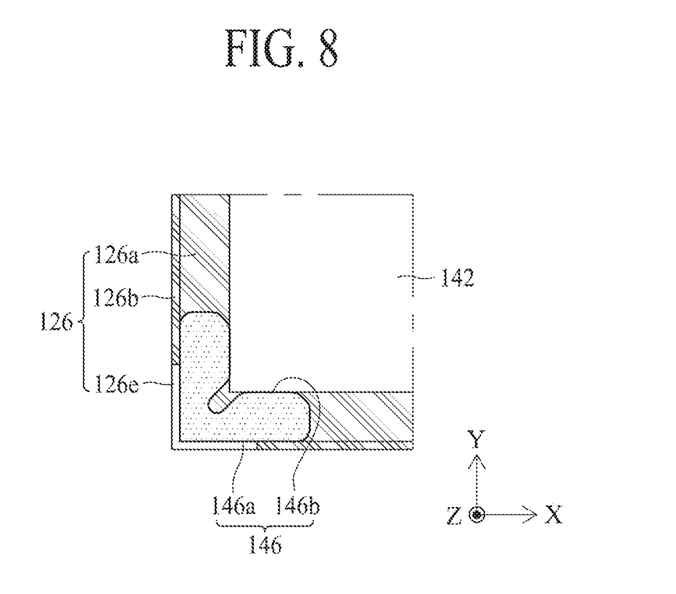
FIG. 8 is a plan view of a display device according to another embodiment of the present invention.
Figure 9:
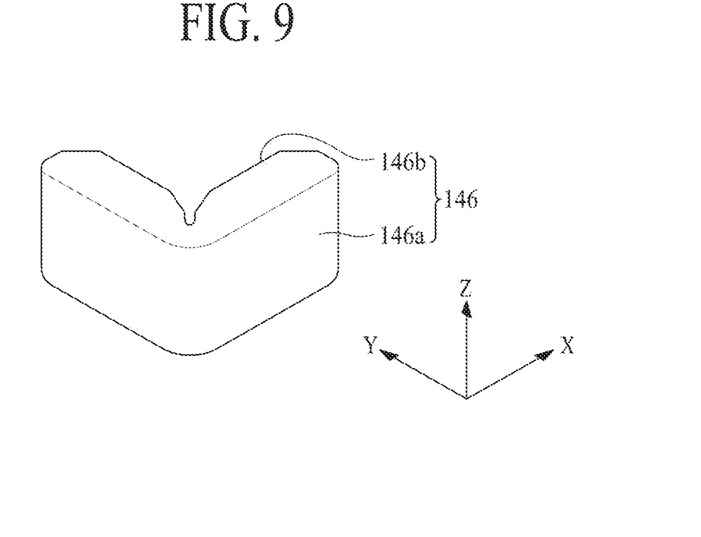
FIG. 9 is a perspective view of a corner fixing member according to an embodiment of the present invention.

FIG. 7 is an exploded perspective view of a display device according to another embodiment of the present invention. FIG. 8 is a plan view of a display device according to another embodiment of the present invention. FIG. 9 is a perspective view of a corner fixing member according to an embodiment of the present invention. Except for a corner fixing member and an accommodating case, the illustration in FIGS. 7 to 9 are the same as the illustration in FIG. 2. Hereinafter, therefore, only the corner fixing member and the accommodating case will be described, and repetitive descriptions on the same elements are omitted.

A corner fixing member 146 may be disposed in a corner of a case side wall 126b of an accommodating case 126 to support a corner of the light guide plate 142. The corner fixing member 146 may fix the light guide plate 142 along with a light guide plate fixing member 145. In this case, the corner fixing member 146 may include an outer portion 146a and an inner portion 146b.

The outer portion 146a may be a surface contacting a case side wall 126b of the accommodating case 126 in the corner fixing member 146 and may support the corner fixing member 146 to the case side wall 126b in order for the corner fixing member 146 not to be pushed from the light guide plate 142 any longer. The outer portion 146a prevents light leakage from occurring in a corner of the case side wall 126b.

The inner portion 146b may be a surface contacting a corner of the light guide plate 142 in the corner fixing member 146 and may fix the corner in order for the light guide plate 142 not to move.

The accommodating case 126 may include a floor 126a, the case side wall 126b, and a corner groove 126e.

The floor 126a may support the light guide plate 142, and only an end of the floor 126a may be bent, thereby supporting the light guide plate 142.

The case side wall 126b may be vertically bent from one end of the floor 126a. A plurality of coupling grooves 126b1 and 126b2 and a coupling projection 126b3 may be provided on one side or the other side of the case side wall 126b.

The corner groove 126e may be a groove provided in a corner of the case side wall 126b and may be provided smaller than the corner fixing member 146. The outer portion 146a of the corner fixing member 146 may be exposed to outside the case side wall 126b by the corner groove 126e. Therefore, in a case where the corner fixing member 146 is disposed on the case side wall 126b of the accommodating case 126 and the light guide plate 142 is accommodated, the corner fixing member 146 having elasticity may be pushed to the corner groove 126e provided on the case side wall 126b by the light guide plate 142, and then, the light guide plate 142 may return to an original shape and may be stably disposed in the accommodating case 126. The corner groove 126e may be provided in the corner of the case side wall 126b in order for the light guide plate 142 to be stably disposed in the accommodating case 126, but since light can be leaked to the corner groove 126e, the corner fixing member 146 larger than the corner groove 126e may be formed of a material which absorbs light.

Since the display device according to another embodiment of the present invention includes the light guide plate fixing member 145 and the corner fixing member 146, the light guide plate 142 is stably supported, and the light guide plate 142 is prevented from being cracked due to friction with other elements even when being shaken. Also, the corner fixing member 146 according to another embodiment of the present invention prevents leakage of light, thereby preventing the image quality of the display device from being degraded. Also, in the corner fixing member 146 according to another embodiment of the present invention, the corner groove 126e may be provided on the case side wall 126b of the accommodating case 126, and thus, the light guide plate 142 is stably disposed in the accommodating case 126. Accordingly, an assembly defect of the display device according to another embodiment of the present invention is prevented, and the quality and reliability of the display device are prevented from being reduced.

Figure 10:
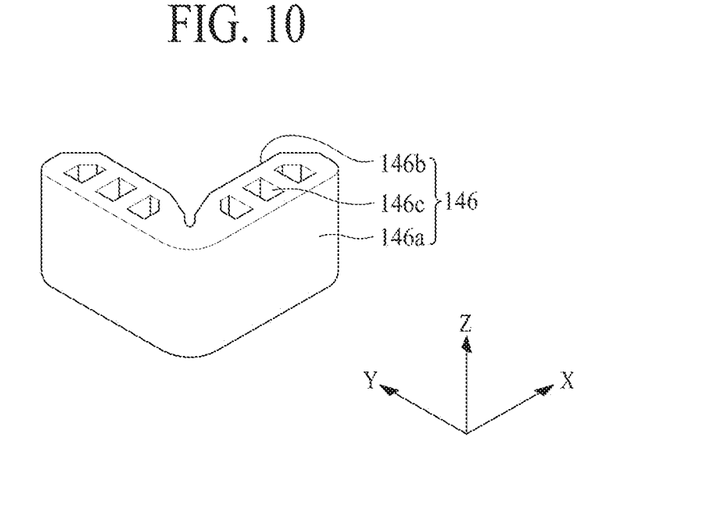
FIG. 10 is a perspective view of a corner fixing member according to another embodiment of the present invention.

FIG. 10 is a perspective view of a corner fixing member 146 according to another embodiment of the present invention.

Referring to FIG. 10, the corner fixing member 146 may include an outer portion 146a, an inner portion 146b, and a hollow portion 146c.

The outer portion 146a of the corner fixing member 146 may contact a corner of a case side wall 126a, and the inner portion 146b may contact a corner of the light guide plate 142. The corner fixing member 146 may surround a corner of the light guide plate 142 to fix and support the light guide plate 142.

The hollow portion 146c may be one or more holes which are provided to pass through a space between the outer portion 146a and the inner portion 146b of the corner fixing member 146 in a vertical direction (a Z-axis direction). The hollow portion 146c may provide a compression space in the corner fixing member 146 having elasticity. Accordingly, when the light guide plate 142 is shaken by an external impact, the hollow portion 146c may absorb the external impact.

As described above, according to the embodiments of the present invention, since the display device includes the light guide plate fixing member, the light guide plate is prevented from being cracked due to friction with other elements even when the display device is shaken.

Moreover, in the display device according to the embodiments of the present invention, the light guide plate may be accommodated into the accommodating case, and then, the light guide plate fixing member may be fitted into and coupled to the accommodating case, thereby preventing an assembly defect which occurs when a sufficient space for assembling the light guide plate with the accommodating case is not provided due to the light guide plate fixing member.

Moreover, when the display device according to the embodiments of the present invention is inclined, the light guide plate is prevented from downward sagging due to a load, and thus, a certain interval between the light guide plate and the light source unit is maintained. Accordingly, the display device maintains certain brightness, thereby preventing the image quality of the display device from being degraded.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight unit comprising:
   a light guide plate;
   a light source unit irradiating light onto a light incident surface provided on a side surface of the light guide plate;
   an accommodating case including a case side wall which supports the light guide plate and surrounds a side surface of the light guide plate; and
   a light guide plate fixing member installed on the case side wall to prevent a movement of the light guide plate,
   wherein the light guide plate fixing member comprises a side groove passing through a portion under a side surface of the light guide plate fixing member in a lengthwise direction.

2. The backlight unit of claim 1, wherein the case side wall is inserted into the side groove.

3. The backlight unit of claim 2, wherein the light guide plate fixing member comprises a center hole through which a portion of the case side wall passes.

4. The backlight unit of claim 1, wherein the light guide plate fixing member comprises:
   a first fixing part disposed between an inner surface of the case side wall and the light guide plate;
   a second fixing part disposed on an outer surface of the case side wall in parallel with the first fixing part; and
   a connection part disposed on the case side wall to connect the first fixing part to the second fixing part.

5. The backlight unit of claim 4, wherein the connection part comprises a center hole through which a portion of the case side wall passes.

6. The backlight unit of claim 4, further comprising:
   a panel supporting part covering the connection part; and
   a guide frame including a guide side wall covering the second fixing part.

7. The backlight unit of claim 4, wherein the light guide plate fixing member comprises a chamfer part provided in a corner opposite to the connection part and inclined.

8. The backlight unit of claim 1, wherein the light guide plate fixing member is installed in the accommodating case facing side surfaces other than the light incident surface among side surfaces of the light guide plate.

9. The backlight unit of claim 8, further comprising:
   a corner groove provided in a corner of the accommodating case; and
   a corner fixing member disposed between a corner of the light guide plate and the corner of the accommodating case.

10. A display device comprising:
    the backlight unit of claim 1; and
    a liquid crystal panel disposed in the backlight unit.

11. The display device of claim 10, wherein the case side wall is inserted into the side groove.

12. The display device of claim 11, wherein the light guide plate fixing member comprises a center hole through which a portion of the case side wall passes.

13. The display device of claim 10, wherein the light guide plate fixing member comprises:
    a first fixing part disposed between an inner surface of the case side wall and the light guide plate;
    a second fixing part disposed on an outer surface of the case side wall in parallel with the first fixing part; and
    a connection part disposed on the case side wall to connect the first fixing part to the second fixing part.

14. The display device of claim 13, wherein the connection part comprises a center hole through which a portion of the case side wall passes.

15. The display device of claim 13, further comprising:
    a panel supporting part covering the connection part; and
    a guide frame including a guide side wall covering the second fixing part.

16. The display device of claim 13, wherein the light guide plate fixing member comprises a chamfer part provided in a corner opposite to the connection part and inclined.

17. The display device of claim 10, wherein the light guide plate fixing member is installed in the accommodating case facing side surfaces other than the light incident surface among side surfaces of the light guide plate.

18. The display device of claim 17, further comprising:
    a corner groove provided in a corner of the accommodating case; and a corner fixing member disposed between a corner of the light guide plate and the corner of the accommodating case.

* * * * *